(12) United States Patent
Rollet

(10) Patent No.: US 10,805,435 B2
(45) Date of Patent: Oct. 13, 2020

(54) METHOD OF PROCESSING DATA STREAM, COMPUTER PROGRAM PRODUCT AND CLASSIFIER FOR PROCESSING DATA STREAM

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 16/061,184

(22) PCT Filed: Feb. 9, 2017

(86) PCT No.: PCT/JP2017/005602
§ 371 (c)(1),
(2) Date: Jun. 11, 2018

(87) PCT Pub. No.: WO2017/145898
PCT Pub. Date: Aug. 31, 2017

(65) Prior Publication Data
US 2018/0359342 A1 Dec. 13, 2018

(30) Foreign Application Priority Data
Feb. 26, 2016 (EP) .................................. 16305225

(51) Int. Cl.
*H04L 29/06* (2006.01)
*G06F 16/81* (2019.01)
(Continued)

(52) U.S. Cl.
CPC .............. *H04L 69/22* (2013.01); *G06F 16/81* (2019.01); *G06F 16/9027* (2019.01); *H04L 67/02* (2013.01); *H04L 69/16* (2013.01)

(58) Field of Classification Search
CPC ......... H04L 69/22; H04L 67/02; H04L 69/16; G06F 16/81; G06F 16/9027
See application file for complete search history.

(56) References Cited

U.S. PATENT DOCUMENTS 8,754,905 B2 * 6/2014 Mahajan ................. G06T 11/60
345/619
2012/0124661 A1 5/2012 Lee et al.

FOREIGN PATENT DOCUMENTS

CN 102891779 A 1/2013
WO WO 2007/009210 A1 1/2007

OTHER PUBLICATIONS

"Adding JSON Support to an Existing Security Policy", BIG-IP® Application Security Manager: Implementations—Version 11.6, Chapter 20, Aug. 20, 2014, XP002757622. pp. 165-168.
(Continued)

*Primary Examiner* — Azizul Choudhury
(74) *Attorney, Agent, or Firm* — Birch Stewart Kolasch & Birch LLP

(57) ABSTRACT

The invention relates to a method of processing in real-time a data stream exchanged between a source and a server over a telecommunications network, the method being carried out by a classifier, said classifier storing a first set of a least one test, and a list of existing TCP connections, the method comprising:
  receiving a TCP segment of the data stream, the TCP segment including data payload, said payload comprising at least a portion of a HTTP message;
  identifying a first TCP connection to which the TCP segment belongs or creating a new first TCP connection for the received TCP segment;
  detecting, in the portion of the HTTP message, presence of JavaScript Object Notation, JSON, data;
(Continued)

in the case where JSON data is detected, building a tree graph based on the JSON data;

performing at least one test of the first set on properties of the built tree graph to determine whether the JSON data is invalid;

if the JSON data is invalid, interrupting the first TCP connection.

16 Claims, 4 Drawing Sheets

(51) Int. Cl.
　　*G06F 16/901*　　(2019.01)
　　*H04L 29/08*　　(2006.01)

(56) References Cited

OTHER PUBLICATIONS

Barracuda Networks Inc., "Barracuda Web Application Firewall Administrator's Guide", Barracuda Networks Inc., Dec. 31, 2015, XP002757621, 11 pages.

Barracuda Networks, Inc., "Enhancements to Barracuda Web Application Firewall Streamline On-Premises Central Management", Barracuda Networks, Inc., Jun. 24, 2015, XP002757624, pp. 1-8.

FGE Galiegue et al., "JSON Schema: interactive and non interactive validation; draft-fge-json-schema-validation-OO", Internet Engineering Task Force, IETF; StandardWorkingDraft, Internet Society (ISOC) 4, Rue Des Falaises CH-1205 Geneva, Switzerland, Feb. 1, 2013, XP015089763, pp. 1-25.

Chinese Office Action of CN 201780012338.0 dated Aug. 20, 2020 with English translation.

\* cited by examiner

METHOD OF PROCESSING DATA STREAM, COMPUTER PROGRAM PRODUCT AND CLASSIFIER FOR PROCESSING DATA STREAM

TECHNICAL FIELD

The present invention generally relates to data analysis in communication networks, and more precisely to the classification of data streams.

BACKGROUND ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The HTTP protocol is standardized as RFC 2616 by the Internet Engineering Task Force (IETF) and is transported over the TCP/IP stack (Transport Control Protocol/Internet Protocol). The HTTP protocol can be considered as part of a session level.

HTTP is used for implementing numerous services and is the most used session protocol. Indeed, more and more applications run within a web browser and their communications are based on HTTP.

One advantage of HTTP is simplicity since this protocol supports a few number of request methods, and basic applications use two or three request methods (mainly methods called GET and POST).

According to the HTTP protocol, the HTTP content is inserted into an HTTP body part (or payload) of an HTTP message, and an HTTP header part contains control information of the HTTP message.

In order to improve the HTTP protocol efficiency, some extensions such as persistent connections and pipelining have been developed according to the HTTP protocol standard.

Persistent connection consists in keeping open the TCP connection that carries the HTTP session between an HTTP client and an HTTP server, after the completion of the HTTP request (after reception of an HTTP response from the server). Then, the HTTP client may send another HTTP request on the same TCP connection.

JavaScript Object Notation (JSON) is an open standard format that uses human-readable text to transmit data objects consisting of attribute (also called name or key)-value pairs.

JSON is one of the main data formats used for asynchronous browser/server communication, largely replacing XML (Extensible Markup Language).

JSON is defined by the IETF RFC 7159 dated March 2014.

JSON protocol is used by JSON-RPC (Remote Procedure Call), an RPC protocol that is deployed in many implementations and that can be selected as a replacement for XML-RPC or SOAP (Simple Object Access Protocol).

JSON is a simple protocol that defines only a handful of data types and commands. It can also be used in AJAX (Asynchronous JavaScript and XML) techniques. AJAX is a term for the ability of a webpage to request new data after the webpage has been loaded into the web browser and displayed, usually in response to user actions on the displayed webpage.

JSON is used as the format supported by many open REST (REpresentational State Transfer) API to access web services such as Facebook™, Google™, Spotify™, etc. In that case, it is generally associated with the HTTP/HTTPS protocols carried over TCP.

A JSON content is then part of the HTTP body of an HTTP GET request and/or response.

The MIME (Multipurpose Internet Mail Extension) type set in the HTTP header "Content-Type" is "application-JSON".

JSON defines five basic types:
Number: a signed decimal number that may contain a fractional part and may use exponential E notation;
String: a sequence of zero or more Unicode characters. Strings are delimited with double-quotation marks and support a backslash escaping syntax;
Boolean: either the value true or false;
Array: an ordered list of zero or more values, each of which may be of any type. Arrays use square bracket notation with elements being comma-separated;
Object: an unordered collection of name/value pairs where the names (also called keys) are strings. Since objects are intended to represent associative arrays, it is recommended, though not required, that each key is unique within an object. Objects are delimited with curly brackets and use commas to separate each pair. Within each pair, the character ":" separates the key or name from its value;
Null: an empty value, using the word null.

Whitespace is allowed and ignored around or between syntactic elements. Four ASCII characters are considered as whitespace: space, horizontal tab, line feed and carriage return.

JSON Schema specifies a JSON-based format to define the structure of JSON data in the purpose of automated testing or the validation of client-submitted data. JSON schema is based on the concepts from XMLS Schema (XSD), but is JSON-based. The JSON data schema can be used to validate JSON data.

The main advantages of JSON are simplicity and flexibility.

However, the main drawback of JSON is the textual representation that induces parsing complexity because a single message can have different representations. For this reason, JSON parsing requires a lot of resources and JSON based services may be subjected to Deny of Service attacks more easily.

The great flexibility is also a drawback in some cases since it authorizes complex implementations. Probability of software bugs is therefore higher.

JSON based services may thus be subjected to fuzzing attacks, the attacker trying to find a security hole in the API server by sending random data to the API server.

Thus, there are needs for an efficient method that is able to analyse in real-time JSON data carried by HTTP, checking the validity of the JSON structure and the semantic of the constituting elements, and discarding data representing a potential threat in order to preserve some web services.

SUMMARY OF INVENTION

To address at least some of these needs, a first aspect of the present invention relates to a method of processing in real-time a data stream exchanged between a source and a server over a telecommunications network, the method being carried out by a classifier, a first set of a least one test, and a list of existing TCP connections, the method comprising:

receiving a TCP segment of the data stream, the TCP segment including a payload, said payload comprising at least a portion of a HTTP message;

identifying a first TCP connection to which the TCP segment belongs or creating a new first TCP connection for the received TCP segment;

detecting, in the portion of the HTTP message, presence of JSON data;

in the case where JSON data is detected, building a tree graph based on the JSON data;

performing at least one test of the first set on properties of the built tree graph to determine whether the JSON data is invalid;

if the JSON data is invalid, interrupting the first TCP connection.

Therefore, an early classification of the JSON data can be performed without requiring heavy computing resources. Indeed, a tree graph structure enables to easily access the JSON data and early classification is performed on properties of the tree graph (such as structural features of the graph). This enables to protect the server (or the client) against an attacker. In addition, as the method is performed at the TCP level, it is transparent for the termination peers and can be performed in real time.

According to some embodiments, the tree graph can comprise a plurality of nodes, each node corresponding to a given node type among the following types:
a number;
a string;
a Boolean;
an array;
an object;
null.

Therefore, the structure of the tree graph is specifically dedicated to the JSON language.

As a complement, the tree graph can comprise a plurality of nodes including a root node and at least one child node of the root node, and properties of the tree graph can include any combination of the following:
total number of nodes of the tree graph;
depth of the tree graph;
maximum number of child nodes of a node from the object or array type.

Still in complement, each node of the tree graph with a number, string or Boolean type can be associated with a key and with a value of the key and the combination may further comprise:
maximum length of a key; and/or
maximum length of a value.

Therefore, the early classification does not require heavy computing resources as properties of the tree graph can be easily computed.

In complement or as a variant, each test of the first set can consist in comparing one of the properties of the tree graph with a respective predetermined value, if the property exceeds said respective predetermined value, a counter can be incremented, and if the counter exceeds a predetermined threshold, the JSON data can be classified as invalid.

Therefore, the early classification does not require heavy computing resources as classification of the JSON data is based on comparisons only.

According to some embodiments, if the JSON data is not classified as invalid after performing the at least one test, then a semantic classification based on JSON schema completed with JSON content specification can be performed on the JSON data to classify the JSON data as valid or invalid.

Therefore, semantic classification, which is more demanding than the early classification in terms of computing resources, is performed only if the JSON data has not been classified as invalid.

According to some embodiments, the first TCP connection can be interrupted by sending, by the classifier, a first TCP segment to the client and a second TCP segment to the server, the first and second TCP segments comprising a reset flag.

This enables to protect the server (or the client) against an attacker. In addition, as the method is performed at the TCP level, it is transparent for the termination peers and can be performed in real time.

According to some embodiments, in case where no JSON data is detected in the TCP segment, the TCP segment can be forwarded to a recipient of the TCP segment among the client and the server.

This enables to avoid impacting the latency of data streams that do not comprise JSON data.

According to some embodiments, the classifier can comprise a memory storing a list of monitored TCP connections, and the method can further comprise:
upon identification of the first TCP connection, verifying that the first TCP connection belongs to the list of monitored TCP connections;
if the first TCP connection does not belong to the list of monitored TCP connections, forwarding the TCP segment to a recipient of the TCP segment among the client and the server.

This enables to avoid impacting the latency of data streams that are not concerned by the classification (for example TCP connections with trusted clients).

According to some embodiments, the classifier can comprise a memory storing a list of monitored TCP connections, for each monitored TCP connection, TCP connection information can be maintained, the TCP connection information comprising a Bottom of Window, the received TCP segment can comprise a TCP sequence number, the method can further comprise:
upon identification of the first TCP connection, verifying that the first TCP connection belongs to the list of monitored TCP connections;
if the first TCP connection belongs to the list of monitored TCP connections, verifying that the TCP sequence number corresponds to the Bottom of Window of the first TCP connection;
if the TCP sequence number does not correspond to the Bottom of Window of the first TCP connection, forwarding the TCP segment to a recipient of the TCP segment among the client and the server;
if the TCP sequence number corresponds to the Bottom of Window of the first TCP connection, updating the Bottom of Window of the first TCP connection and going on with detecting presence of JSON data.

As a complement or in variant, each existing TCP connection can be identified by identification information comprising a source address, a TCP source port, an IP destination address and a TCP destination port, the received TCP segment may comprise a header indicating a first source address, a first TCP source port, a first IP destination address and a first TCP destination port.

This enables to efficiently parse the TCP segments to detect whether they belong to an existing TCP connection or not.

According to some embodiments, presence of JSON data can be detected based at least on a first HTTP header value of the HTTP message.

As a complement, the classifier can comprise a HTTP re-assembly buffer, and a size of the re-assembly buffer can be equal to a maximum size of at least the first HTTP header value.

This enables to reduce the amount of memory resource needed for the re-assembly, which is clearly an advantage to support a large number of concurrent TCP connections.

In complement or as a variant, the first HTTP header value can be a value corresponding to a field "Content-Type". JSON data length can also be detected based on a second HTTP header value corresponding to a field "Content-Length".

A second aspect of the invention concerns a computer program product comprising a computer readable medium having stored thereon computer program instructions loadable into a computing device and adapted to—when loaded into and executed by said computing device—cause the computing device to perform a method according to the first aspect of the invention.

A third aspect of the invention concerns a classifier for processing in real-time a data stream exchanged between a source and a server over a telecommunications network, the classifier comprising:

a memory storing a first set of a least one test, and a list of existing TCP connections, the method comprising:
an input interface arranged for receiving a TCP segment of the data stream, the TCP segment including data payload, said payload comprising at least a portion of a HTTP message;
a processor arranged for:
identifying a first TCP connection to which the TCP segment belongs or creating a new first TCP connection for the received TCP segment;
detecting, in the portion of the HTTP message, presence of JSON data;
in the case where JSON data is detected, building a tree graph based on the JSON data;
performing at least one test of the first set on properties of the built tree graph to determine whether the JSON data is invalid;
if the JSON data is invalid, interrupting the first TCP connection.

The present invention is illustrated by way of example, and not by way of limitation, in the figures of the accompanying drawings, in which like reference numerals refer to similar elements and in which:

DESCRIPTION OF EMBODIMENTS

Figure 1:
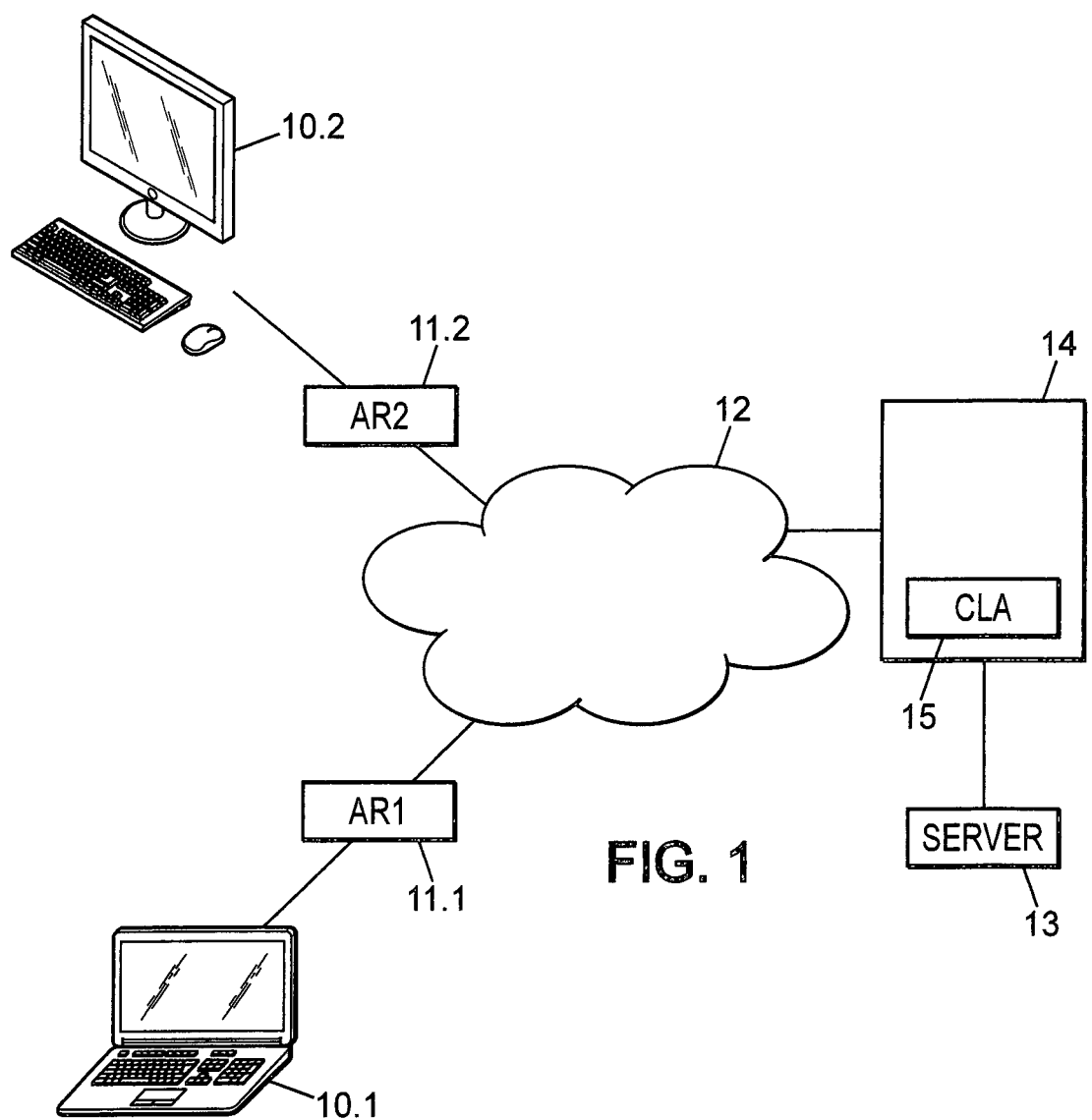
FIG. 1 represents a telecommunications system according to one embodiment of the invention.

FIG. 1 illustrates a system according to an embodiment of the invention.

The system comprises several clients 10.1 and 10.2, which can be for example a laptop 10.1 and a desktop computer 10.2.

No restriction is attached to the clients 10.1 and 10.2, which can be any user devices, such as laptops, desktop computers, touch panels or Smartphones.

The clients 10.1 and 10.2 can access to a telecommunications network 12, such as the Internet, via respective access routers 11.1 and 11.2.

On FIG. 1, the access points 11.1 and 11.2 are accessed via wired means. However, the access routers 11.1 and 11.2 can also be a wireless access point, which can be accessed by clients 10.1 and 10.2 via Wi-fi for example.

The clients can therefore exchange data streams with a server 13 which can be accessed through the access routers 11.1 and 11.2 and the network 12.

For example, the server 13 is an application server using JSON.

An entity 14 is located between the server 13 and the network 12. This entity can for example be a firewall or an Intrusion Prevention System IPS. The entity 14 comprises a classifier 15 according to the invention.

No restriction is attached to the location of the classifier 15, which can alternatively be located in the network 12 or on the client's side (for example in the access router 10.1 or 10.2).

The classifier 15 is in charge of filtering the data streams between the clients 10.1 and 10.2 and the server 13, in particular the data received by the server 13.

Figure 2:
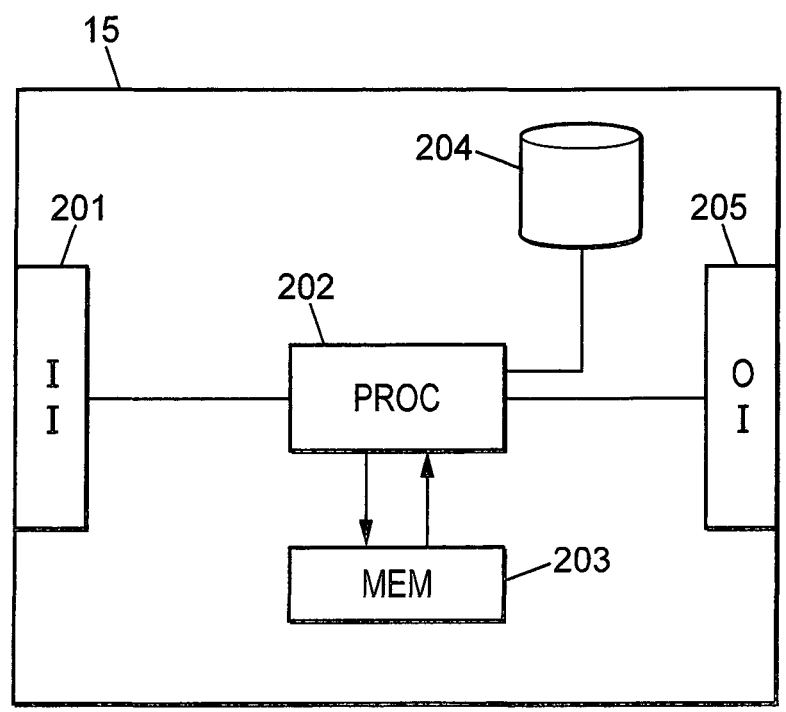
FIG. 2 represents a classifier according to one embodiment of the invention.

FIG. 2 illustrates a detailed structure of a classifier 15 according to some embodiments of the invention.

The classifier 15 comprises an input interface 201, such as an IP packet receiver, a processor 202, a Random Access Memory 203, a mass storage memory 204 and an output interface 205, such as an IP packet transmitter.

Figure 3:
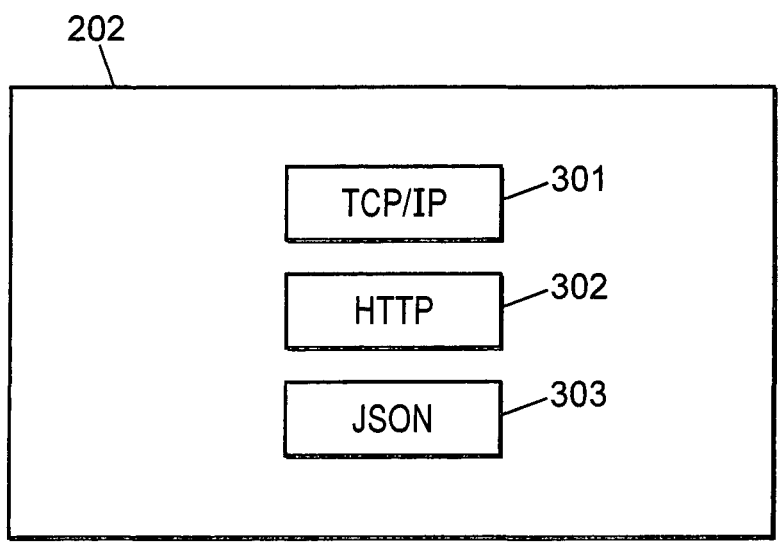
FIG. 3 illustrates a processor of a classifier according to one embodiment of the invention.

An internal structure of the processor 202 is illustrated on FIG. 3, and comprises a TCP/IP processor 301, an HTTP processor 302 and a JSON processor 203.

As explained in what follows, the TCP/IP processor 301 is arranged for classifying the TCP segments received from the IP packet receiver 201, managing several TCP connections and associated information context and ordering, for a given TCP connection, the received TCP segment according to its TCP sequence number.

The HTTP processor 302 is configured to receive ordered TCP segments, delineating HTTP header and extract useful HTTP information such as HTTP method, URL or some particular HTTP header such as Content-Type, as explained above. In particular, when a Content-Type such as "application/j son" is detected, the HTTP processor 302 also delineates the HTTP body. On the contrary, TCP segments that do not convey any HTTP body portion comprising JSON data can be automatically forwarded to the server 13 through the IP packet transmitter 205.

The JSON processor 303 is configured to parse JSON data taking into account a JSON schema, which is a predefined grammar and semantic set of rules stored in the mass storage memory 204, completed with a JSON content specification, which comprise predefined semantic specification stored in the mass storage memory 204. The received TCP segment is filtered (forwarded to a recipient or not) based on the classification of the JSON data.

Figure 4:
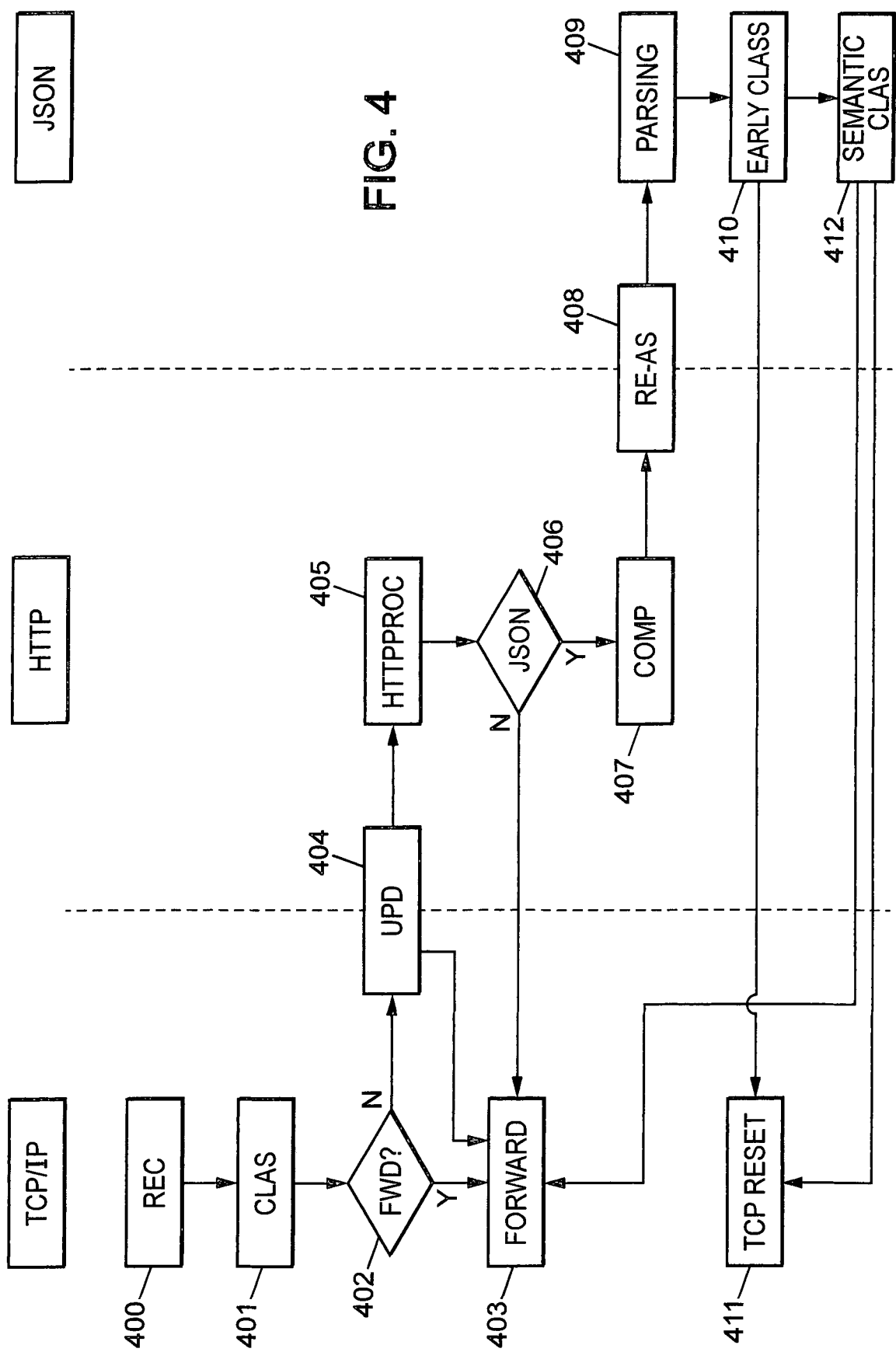
FIG. 4 illustrates the steps of a method according to some embodiments of the invention.

FIG. 4 is a flowchart illustrating the steps of a method carried out by the classifier 15 according to some embodiments of the invention.

In the following example, only the requests sent by the clients 10.1 and 10.2 to the server 13 are processed by the classifier 15. The responses replied by the server 15 are not processed, for example because the server 5 is considered as trusted. However, in some cases, the classifier 15 may analyse and filter the server responses in order to determine whether the server 15 has been infected and is trying to compromise clients 10.1 and 10.2. In that case, the same method steps can be carried out by the classifier 15 for the TCP segments flowing from the server 15 to one of the clients 10.1 and 10.2.

As a TCP connection can be viewed as two independent TCP half connections (one from the client 10.1 or 10.2 to the server 13, and another from the server 13 to the client 10.1 or 10.2), we only consider in the following description the analysis and filtering of the data stream flowing from the client 10.1 or 10.2 to the server 13, for illustrative purpose.

At step 400, a TCP segment is received by the IP packet receiver 201.

At step 401, the TCP segment is classified as belonging to an existing TCP connection or to a new TCP connection. For example, TCP connections can be identified by the quadruplet {IP source address, TCP source port, IP destination address, TCP destination port}. The TCP segment can be parsed to obtain the quadruplet elements and the extracted quadruplet can be compared with the quadruplet of the opened connections. The list of opened connections can for example be stored in the mass storage memory 204.

A new TCP connection can be monitored upon successive receptions of TCP segments with SYN and SYN-ACK handshake packets, providing a TCP connection with the same quadruplet is not already listed in the mass storage memory 204.

If a match is detected, for example with a first TCP connection, then the TCP segment can be classified as belonging to the first TCP connection. Else, a new TCP connection is created and added to the list of opened TCP connections. The new TCP connection is associated with the quadruplet of the received TCP segment.

Among the list of opened TCP connections of the server 13, the classifier 15 can maintain a list of monitored TCP connections. The monitored TCP connections are the TCP connections, which are to be observed by the classifier 15, whereas the non-monitored TCP connections do not need to be observed. For example, the list of monitored TCP connections can be stored in the mass storage memory 204. Additional rules may be defined to determine whether a new TCP connection shall belong to the list of monitored TCP connections or not. For instance, it may be useful to only observe data streams related to the server 13. In that case, a filter on destination port (for example port 80) can be set, and only the TCP connections having this destination port in their quadruplet are monitored.

At step 402, it is determined whether the first TCP connection belongs to the list of the monitored TCP connection or not.

If the first TCP connection does not belong to the list of monitored TCP connections, then the TCP segment is forwarded to a recipient of the TCP segment at step 403 among the server 13 and one of the clients 10.1 and 10.2.

If the first TCP connection belongs to the list of monitored TCP connections, then internal data structures associated with the first TCP connections can be updated at step 404. The internal data structures comprises TCP information context which stores persistent data related to the first TCP connection, such as connection state, Bottom of Window, etc. The internal data structures also comprise a TCP segment pending list gathering received TCP segments ordered by their segment numbers. Upon detection of a new TCP connection, the TCP/IP processor 301 allocates a new data structure to the TCP connection. A TCP connection is released upon reception of a TCP segment with a RST or FIN flag.

Updating step 404 comprises inserting the received TCP segment in the TCP segment pending list of the first TCP connection, ordered by sequence numbers. If the sequence number of received TCP segment is not equal to the Bottom of Window of the first TCP connection (i.e. is an out of sequence TCP segment), then the method goes to step 403 and the TCP segment is forwarded to the recipient of the TCP segment. Else, the Bottom of Window is updated at step 404, on the basis of the length of TCP segment length.

TCP segments that are not forwarded are kept for further analysis by higher layer processors 302 and 303 from step 405.

At step 405, the TCP segment (which has not been forwarded) and further consecutive segments of the TCP pending list are processed and analyzed by the HTTP processor 405.

For example, a HTTP message encapsulated in the payload of one or more TCP segments may have the following structure:

| | |
|---|---|
| Request line | GET/hello.htm http/1.1 |
| | User-Agent :Mozilla/4.0 (compatible ; MSIE5.01 ; Windows NT) |
| | Host : www.tutorialspoint.com |
| HTTP header | Accept-Language:en-us |
| | Accept-Encoding:gzip, deflate |
| | Connection : Keep-Alive |
| | ContentLength : 99; |
| | Content-type : Application/json |
| | { |
| | "firstName" : "John", |
| HTTP body | "age" : 25, |
| | "phoneNumbers" : [ ], |
| | "children" : ["bernard", "bianca"], |
| | } |

Because a HTTP message can be split over several consecutive TCP segments, it may be necessary to re-assemble some portions of the HTTP message. However, the re-assembly process at step 405 is only necessary to extract a relevant HTTP header value such as Content-Type, Content-Length, so as to detect presence or absence, at step 406, of JSON data in the HTTP message.

The present invention therefore proposes to use a reassembly-buffer having a depth that is set to the maximum length of extracted header values (the maximum length of the Content-Type and Content-Length values). This enables to reduce the amount of memory resource needed, which is a clear advantage when a large number of concurrent TCP connections are monitored.

For example, two consecutive TCP segments can be as follows:

TCP/IP header: segment1
GET/hello.htm http/1.1
User-Agent :Mozilla/4.0
(compatible ;MSIE5.01 ;
Windows NT)
Host : www.tutorialspoint.com
Accept-Language:en-us
Accept-Encoding:gzip, deflate
Connection : Keep-Alive
ContentLength : 99;
Content-type : applicat
TCP/IP header : segment 2
ion/json

```
{
"firstName" : "John",
"age" : 25,
"phoneNumbers" : [ ],
"children" : ["bernard",
"bianca"],
}
```

In the particular example illustrated above, the relevant HTTP header values (corresponding to Content-Type) are split over two TCP segments, which shows that a re-assembly buffer may be useful to detect presence of JSON data at step 406.

If absence of JSON data is detected at step 406, then the received TCP segment located at the Bottom of Window is forwarded at step 403.

The body of the HTTP message can be identified by finding an empty line after the last HTTP header (after the Content-Type field in the example). If presence of JSON data is detected at step 406, then the JSON data is compressed (meaning that white space characters are removed) at step 407, and the compressed JSON data can be copied at step 408 in a JSON data re-assembly buffer. The length of the JSON data is given by the "Content Length" HTTP header. When HTTP persistent connection is used, the next HTTP request/response can then be delineated once the end of the JSON data is detected.

The JSON processor 303 is arranged to parse the JSON data contained in the JSON data re-assembly buffer, at step 409, in order to generate an internal representation of the JSON data as a tree graph.

The tree graph comprises a plurality of nodes, each node being for example represented by a structure that comprises any combination of the following elements:
 a node type: number (0), string (1), Boolean (2), array (3), object (4), null (5);
 a key string start index into the compressed JSON textual data;
 a key string length (which can be equal to 0 if there is no key name, in particular for array items);
 a value string start index for Boolean, integer and string nodes;
 a value string length for Boolean, integer and string nodes.

For array items, the key string start index can be replaced by the index inside the array (0 for the first item, 1 for the second one, etc. . . . ) and the key string length can be set to 0.

For objects and arrays, the value string start index and length can be replaced by a list of pointers toward children nodes.

These rules for building a tree graph based on JSON data are only given for illustrative purposes, and the present invention encompasses any method for building a tree graph based on JSON data.

Figure 5:
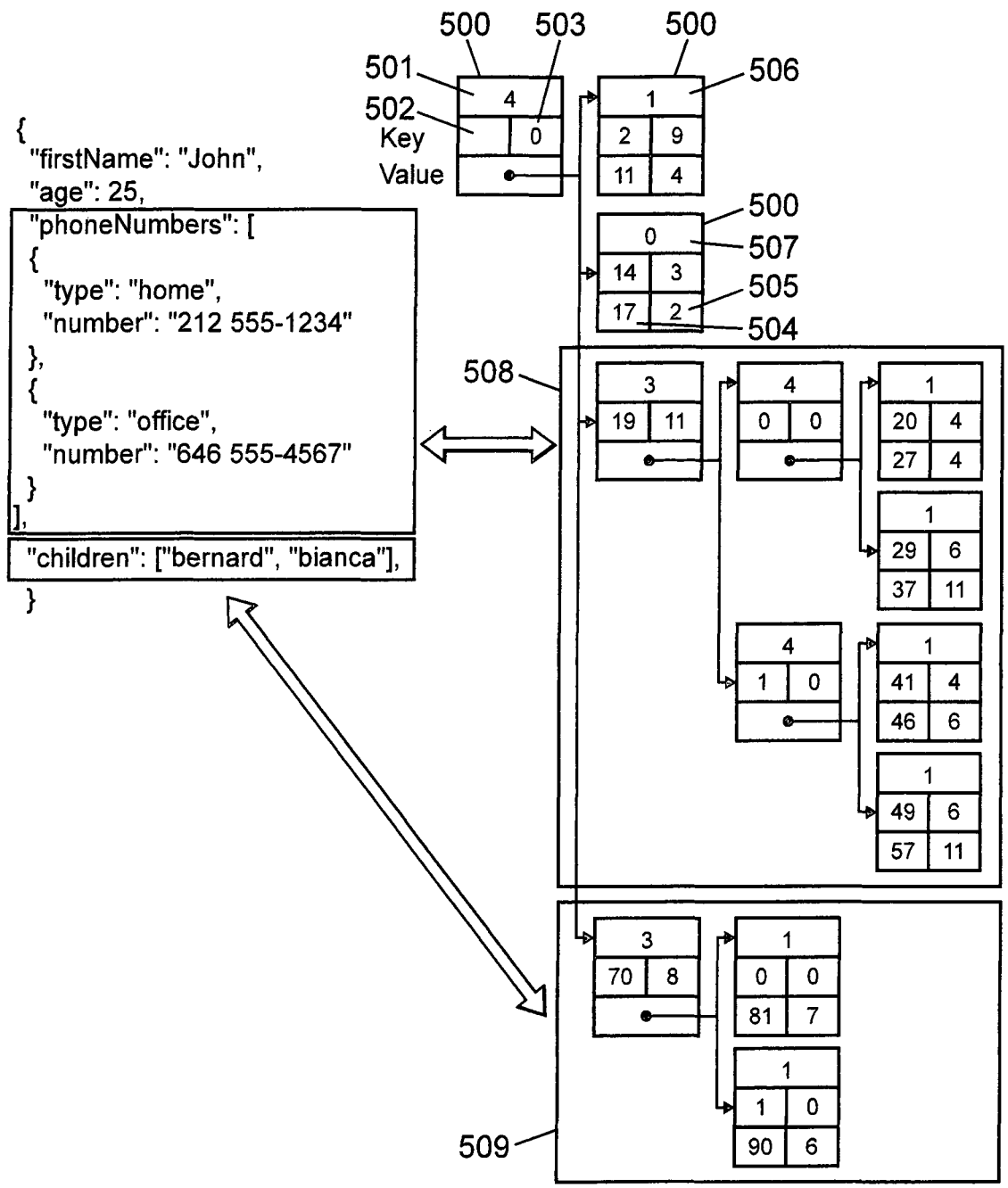
FIG. 5 illustrates a tree graph representing JSON data according to some embodiments of the invention.

FIG. 5 illustrates an internal tree graph structure that can be obtained based on the example of JSON data given above.

On FIG. 5, each node is referenced 500 and comprises, as detailed above, a node type 201, a key string start index 502, a key string length 503, a value string start index 504 and a value string length 505.

For example, the root node is an object (type=4) and has therefore a key string start length of 0. The value string start index and length are, as explained above, a pointer to the four child nodes 506, 507, 508 and 509.

The first child node 506 represents the JSON data portion "firstName": "John":
 '1' in the field 501 means that the node is a string;
 '2' in the field 502 means that the key "firstName" of the node starts at index 2 in the JSON data (second character of the JSON data);
 '9' in the field 503 is the length of the key "firstName";
 '11' in the field 504 means that the value "John" of the node starts at index 11 in the JSON data;
 '4' in the field 505 is the length of the value "John".

The child node 507 represents the JSON data portion "age":25, which is a number. The child node 508 represents the array "phoneNumbers" and the child node 509 represents the array "children".

Therefore, the JSON processor 303 is arranged to get the JSON data from the JSON data re-assembly buffer and to build the tree graph, at step 409. According to some embodiments, the parsing step 409 can be interrupted when the description of a node is incomplete (i.e. the JSON data re-assembly buffer does not contain enough JSON data). Then, an end-of-analysis pointer can be moved at the beginning of the description of the incomplete node. The parsing step 409 can be resumed upon reception of the next TCP segment of the first TCP connection with a sequence number equal to the Bottom of Window.

Such a tree graph can be advantageously used by the JSON processor 303 to quickly access any JSON node and browse the JSON data.

Referring back to FIG. 4, properties of the generated tree graph can also be used to perform an early classification of the JSON data at step 410.

An early classification refers to a classification that is preliminary to a deeper classification, such as a semantic classification, as explained hereafter.

For example, one or several of the following tree graph properties may be taken into account for early classification at step 410:
 total number of nodes;
 depth of the tree graph;
 maximum number of child nodes for an object/array;
 maximum length of a key;
 maximum length of a value.

Based on the JSON schema, some criteria on these properties can be predefined and checked for early classification at step 410.

For example, the JSON schema details the grammar and semantic of the JSON API used by the server 13. The JSON content specification may complete the semantic of the JSON API used by the server 13.

For example, for a simple API, it can be considered that the total number of nodes is less than N, N being an integer, and that the graph has a maximum depth of M, M being an integer. The number of child nodes for an object/array can also be limited to a given predetermined value, which depends on the JSON API.

Therefore, a first set of tests is predefined. Each of these tests can return a result, for example OK (success) or NOK (failure). If the number of NOK is equal to or greater than a first predefined threshold, then the JSON data can be classified as invalid. The number of NOK can be determined by incrementing a counter each time a NOK result is issued for a test.

Alternatively, only one test can be applied. In that case, the result of the test is used to classify the JSON data at step 410.

If the JSON data is classified as invalid by the early classification at step 410, then the TCP/IP processor 301 may interrupt the first TCP connection at step 411. For example, the TCP/IP processor 301 can generate two TCP segments comprising a reset flag and send the generated TCP segments to the source and to the recipient, thereby closing the first TCP connection. This enables to protect the termination peers, without requiring heavy computational resources, as the early classification only requires comparison with predefined thresholds.

If the JSON data is not classified as invalid at step 410, then the JSON processor 303 may perform a semantic classification at step 412.

For example, from the JSON content specification associated with the JSON API used by the server 13, semantic rules related to the key and value elements can be defined for each JSON node semantic type. Each key string can be matched with a dictionary (i.e. a set of possible values) depending on the position of the node within the tree graph representing the JSON data.

For instance, in the example of FIG. 5, the possible key values at the first level of the tree graph are {"firstName", "age", "phoneNumbers", "children"} and the possible key values within the "phoneNumbers" object are {"type", "number"}.

Concerning the values, different rules can be defined depending on whether the node is a number, string or Boolean:

for numbers, it can be checked that the number value belongs to a predefined range;

for strings, character sets can be predefined, including subsets of ASCII or UTF-8 character sets. For instance, a phone number value will only include digits and hyphens.

Each rule that is checked for a given node depends on the semantic type of the given node.

Again, a second set of tests (or rules) can be checked, and results such as OK and NOK can be returned. If the number of NOK results exceeds a second predefined threshold, then the JSON data can be classified as invalid and the TCP/IP processor 301 may interrupt the first TCP connection at step 411. Else, JSON data can be classified as valid, and the received TCP segment located at the Bottom of Window is forwarded at step 403

Therefore, as shown on FIG. 1, the method according to the invention is preferably carried out in a classifier 15 in front of the protected server 13 that runs web services. In such a topology the classifier 15 is able to intercept any TCP/IP packet carrying an incoming request sent by a web API untrusted client 10.1 or 10.2. Once analysed by the system, the IP packets (or TCP segments) are simply forwarded to the intended web server 15. When JSON data is detected as dangerous, the method according to the invention proposes to reset the TCP connection instead of forwarding the TCP segment, so as to protect the server 13. At the TCP level, the analysis process is transparent since the TCP acknowledgment scheme is managed by the termination peers (the server 13 and the clients 10.1 and 10.2). Therefore, the method according to the invention does not require a complex TCP management layer, which is clearly a benefit, as it allows to simultaneously process a large number of concurrent connections.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of processing in real-time a data stream exchanged between a source and a server over a telecommunications network, the method being carried out by a classifier, said classifier storing a set of at least one test, and a list of existing TCP connections, the method comprising;

receiving a first TCP connection to which the TCP segment belongs or creating a new first TCP connection for the received TCP segment;

identifying a first TCP connection to which the TCP segment belongs or creating a new first TCP connection for the received TCP segment;

detecting, in the portion of the HTTP message, presence of JSON data;

in the case where JSON data is detected, building a tree graph based on the JSON data;

performing at least one test of the set on properties of the built tree graph to determine whether the JSON data is invalid;

if the JSON data is invalid, interrupting the first TCP connection.

2. The method according to claim 1, wherein the tree graph comprises a plurality of nodes, each node corresponding to a given node type among the following types:
   a number;
   a string;
   a Boolean;
   an array;
   an object;
   null.

3. The method according to claim 2, wherein the tree graph comprises a plurality of nodes including a root node and at least one child node of the root node, wherein properties of the tree graph includes any combination of the following:
   total number of nodes of the tree graph;
   depth of the tree graph;
   maximum number of child nodes of fa node from the object or array type.

4. The method according to claim 3, wherein each node of the tree graph with a number, string or Boolean type is associated with a key and with a value of the key and wherein the combination further comprises:
   maximum length of a key; and/or
   maximum length of a value.

5. The method according to claim 3, wherein each test of the set consists in comparing one of the properties of the tree graph with a respective predetermined value, wherein if the property exceeds said respective predetermined value, a counter is incremented, and wherein, if the counter exceeds a predetermined threshold, the JSON data is classified as invalid.

6. The method according to claim 1, wherein if the JSON data is not classified as invalid after performing the at least one test, then a semantic classification based on JSON schema completed with JSON content specification is performed on the JSON data to classify the JSON data as valid or invalid.

7. The method according to claim 1, wherein the first TCP connection is interrupted by sending, by the classifier, a first TCP segment to the client and a second TCP segment to the server, said first and second TCP segments comprising a reset flag.

8. The method according to claim 1, wherein, in case where no JSON data is detected in the TCP segment, the TCP segment is forwarded to a recipient of the TCP segment among the client and the server.

9. The method according to claim 1, wherein the classifier comprises a memory storing a list of monitored TCP connections, wherein the method further comprises:
   upon identification of the first TCP connection, verifying that the first TCP connection belongs to the list of monitored TCP connections;
   if the first TCP connection does not belong to the list of monitored TCP connections, forwarding the TCP segment to a recipient of the TCP segment among the client and the server.

10. The method according to claim 1, wherein the classifier comprises a memory storing a list of monitored TCP connections, wherein, for each monitored TCP connection, TCP connection information is maintained, said TCP connection information comprising a Bottom of Window; wherein the received TCP segment comprises a TCP sequence number;
   wherein the method comprises:
   upon identification of the first TCP connection, verifying that the first TCP connection belongs to the list of monitored TCP connections;
   if the first TCP connection belongs to the list of monitored TCP connections, verifying that the TCP sequence number corresponds to the Bottom of Window of the first TCP connection;
   if the TCP sequence number does not correspond to the Bottom of Window of the first TCP connection, forwarding the TCP segment to a recipient of the TCP segment among the client and the server;
   if the TCP sequence number corresponds to the Bottom of Window of the first TCP connection, updating the Bottom of Window of the first TCP connection and going on with detecting presence of JSON data.

11. The method according to claim 9, wherein each existing TCP connection is identified by identification information comprising a source address, a TCP source port, an IP destination address and a TCP destination port;
   wherein the received TCP segment comprises a header indicating a first source address, a first TCP source port, a first IP destination address and a first TCP destination port.

12. The method according to claim 1, wherein presence of JSON data is detected based at least on a first HTTP header value of the HTTP message.

13. The method according to claim 12, wherein the classifier comprises a HTTP re-assembly buffer, and wherein a size of the re-assembly buffer is equal to a maximum size of at least the first HTTP header value.

14. The method according to claim 12, wherein the first HTTP header value is a value corresponding to a field "Content-Type" and wherein JSON data length is detected based on a second HTTP header value corresponding to a field "Content-Length."

15. A computer program product comprising a non-transistory computer readable medium having stored thereon computer program instructions loadable into a computing device and adapted to—when loaded into and executed by said computing device—cause the computing device to perform a method according to claim 1.

16. A classifier for processing in real-time a data stream exchanged between a source and a server over a telecommunications network, wherein the classifier comprises:
   a memory storing a set of at least one test, and a list of existing TCP connections, the method comprising:
   an input interface arranged for receiving a TCP segment of the data stream, the TCP segment including data payload, said payload comprising at least a portion of a HTTP message;
   a processor arranged for:
      identifying a first TCP connection to which the TCP segment belongs or creating a new first TCP connection for the received TCP segment;
      detecting, in the portion of the HTTP message, presence of JSON data;
      in the case where JSON data is detected, building a tree graph based on the JSON data;
      performing at least one test of the set on properties of the built tree graph to determine whether the JSON data is invalid;
      if the JSON data is invalid, interrupting the first TCP connection.

* * * * *